Patented Nov. 21, 1950

2,531,097

UNITED STATES PATENT OFFICE 2,531,097

AQUEOUS AMINO ACID SOLUTIONS

Sidney Alpert and Gustav J. Martin, Philadelphia County, Pa., assignors to The National Drug Company, Philadelphia, Pa., a corporation of Pennsylvania No Drawing. Application January 7, 1948, Serial No. 1,056

5 Claims. (Cl. 167—65)

Our invention relates to an improved aqueous solution of amino acids, that is suitable for injection into the human body and is stabilized against the formation of precipitates. More particularly, it concerns such a solution containing in addition to the amino acids a substance that exerts a solubilizing effect thereon and which constitutes a source of nutrient energy having high calorific value.

Amino acids are used extensively in human medicine, in order to restore and maintain a positive nitrogen balance in the body and to help build tissue. They are frequently administered parenterally in the form of aqueous solutions. Unfortunately, the standardized and sterile aqueous solutions of amino acids exhibit a lack of stability which becomes apparent by the gradual formation of precipitates whose exact nature is unknown. They thereby become unsuitable for parenteral administration and may endanger the well-being of the patient.

Aqueous amino acid solutions, when administered parenterally or otherwise, are to be utilized by the body for the production of tissue. It is desirable simultaneously to supply a source of nutrient energy having high calorific value, so that the amino acids may be used to their fullest extent for the intended purpose. In the absence of such a source of nutrient energy of high calorific value, the amino acids themselves are called upon to supply such energy instead of being used to build tissue.

It is an object of our invention to provide stabilized aqueous solutions of amino acids, that will retain desirable pharmaceutical and physiological properties, and for which the human circulatory system will have a high degree of tolerance. Another object is to include in such solutions a convenient source of nutrient energy having high calorific value to insure maximum efficiency. A further object is to have present therein a truly water-soluble agent that will serve to solubilize the amino acids, thus preventing the formation of precipitates during handling and storage. Additional objects and advantages of our invention will become apparent from the following detailed description thereof.

We have discovered that the foregoing objects may be accomplished simply and effectively by including sorbitol in such aqueous solutions of amino acids. Sorbitol is a hexahydric alcohol that forms true solutions in water and is an effective solubilizing agent for the amino acids, so that its addition to the aqueous amino acid solutions serves to stabilize such solutions against the formation of precipitates during the usual treatments, such as sterilization, and when stored over long periods of time. It may be added at any convenient stage in the production of the standardized and sterilized amino acid solutions. However, it is desirable to include it at the outset by dissolving both the sorbitol and the amino acids in water, treating the solution with activated carbon, filtering the mixture, and then sterilizing the filtrate at 100° C. or higher if desired.

Not only is sorbitol a highly effective solubilizing agent for the amino acids and readily tolerated by the human circulatory system, but it serves simultaneously as a source of nutrient energy having high calorific value, thus assuring maximum efficiency of the solutions. Consequently, the aqueous amino acid solutions obtained with the addition of sorbitol are fully stabilized against the formation of precipitates and possess highly desirable pharmaceutical and physiological properties.

Our invention is applicable to aqueous solutions of amino acids generally, but a preferred embodiment resides in the mixture of amino acids obtained by the acid hydrolysis of casein. Such mixtures of amino acids may, if desired, be modified by the addition of tryptophane and/or methionine. One may also use solutions of a single amino acid or of mixtures of two or more amino acids obtained from other sources. Generally speaking, we prefer to employ rather concentrated solutions of the amino acids, as the benefits of our invention thereby become most apparent. Such solutions will contain at least 5% by weight of amino acids and often as high as 15%. The maximum percentage that may be employed in any particular case will depend upon the solubility of the amino acid or acids present in the solution.

The sorbitol may be employed in concentrations as low as 0.5% by weight of the amino acid solution and yet exhibit a very substantial solubilizing effect. However, we prefer to use much higher concentrations, up to 20% and even more, in order simultaneously to provide an ample source of calories. The use of such relatively high concentrations is possible owing to the excellent solubility of the sorbitol and to its ready tolerance by the human system.

We are aware that efforts have been made to stabilize aqueous amino acid solutions for injection purposes. The U. S. Patent No. 2,411,897 to Sahyun suggests the addition of from 0.25 to 3% by weight of a wholly organic, hydrophilic, protective colloid, such as gelatin, starch, pectin alginic acid, alginates and the like, for this purpose. However, such colloid forming materials do not produce true aqueous solutions and are not capable of utilization by the body for calorific purposes. Furthermore, they do not possess the very important solubilizing effect of the sorbitol. Such effect is related to the increased surface activity (reduced surface tension) of the solutions, derived from the hydroxyl groups of this hexahydric alcohol. The increased surface activity of the solutions results in better utilization of the amino acids by the body owing to better absorption.

In respect to its availability as a source of nutrient energy of high calorific value, sorbitol is comparable to hexoses, such as dextrose and glucose. However, these hexoses have a tendency to react with some of the amino acids, such as tryptophane, and also are susceptible to decomposition at the temperatures required for sterilization. Furthermore, the sorbitol is preferable to the hexoses in cases where diabetes is factor, because some time elapses before it is converted by the body and appears in the blood as glucose.

In the following examples we shall explain how solutions may be made in accordance with our invention. These examples are solely for purposes of illustration, and our invention is not limited to the details given therein.

*Example I*

100 grams of a mixture of amino acids obtained by the acid hydrolysis of casein were added to 800 cc. of pyrogen-free distilled water, while stirring, and the solution was heated to 60° C. Thereupon 100 grams of pure sorbitol were added to the solution, while stirring was continued. The resulting solution was then treated with activated carbon for 20 minutes. The carbon was filtered off and one gram of dl-tryptophane and 2 grams of dl-methionine were dissolved in the filtrate. The volume of the resultant solution was adjusted to one liter by the addition of pyrogen-free distilled water, and its pH adjusted to between 6.9 and 7.3 by the addition of a 10% caustic soda solution. The resulting solution was again filtered and filled into a glass bottle wherein it was sterilized at 100° C. for 45 minutes.

The foregoing sterilized solution was found to be stable upon storage for a period of over six months. At the end of this period no trace of a precipitate could be found. A control solution, prepared in the same manner but omitting the sorbitol, formed quite appreciable amounts of precipitates at the bottom of the container.

*Example II*

60 grams of a mixture of amino acids obtained by tryptic digestion of lactalbumin were added to 800 cc. of pyrogen-free distilled water, while stirring, and the solution was heated to 60° C. There were then added to the solution, while stirring, 60 grams of pure sorbitol. Thereupon the resultant solution was treated with activated carbon for 20 minutes, after which the carbon was removed by filtration. The pH of the filtrate was adjusted to between 6.9 and 7.3 by means of a 10% NaOH solution and its volume increased to one liter by the addition of pyrogen-free distilled water. The solution so formed was then sterilized by heating it in a glass bottle at 120° C. for 20 minutes.

The stabilized, standardized and sterilized solutions prepared in accordance with the foregoing examples were administered parenterally to both animals and humans, after storage for periods up to six months, without displaying any ill effects whatever. The solutions prepared according to our invention were substantially more effective in promoting tissue growth than were freshly prepared control solutions from which the sorbitol had been omitted. In view of their favorable osmotic pressures and nutrient values, our aqueous solutions of amino acids, stabilized with sorbitol, may be employed as substitutes for blood plasma in order to furnish protein requirements, as well as a source of energy. If desired, additional water-soluble substances, such as salt, glucose, etc. may be incorporated.

As many apparently widely different embodiments of our invention may be made without departing from the spirit and scope hereof, it is to be understood that the invention is not limited to the specific embodiments herein described, except as defined in the appended claims.

We claim:

1. A clear, stable, aqueous solution suitable for parenteral administration, said solution containing a mixture of amino acids one of which is tryptophane and at least 0.5% by weight of sorbitol.

2. A solution as claimed in claim 1 containing at least 5% by weight of the mixture of amino acids.

3. A solution as claimed in claim 1 wherein the mixture of amino acids is an acid hydrolysate of casein and tryptophane.

4. A clear, stable, aqueous solution suitable for parenteral administration, said solution containing from 5% to 15% by weight of a mixture of amino acids one of which is tryptophane and from 0.5 to 20% by weight of sorbitol.

5. A solution as claimed in claim 4 wherein the mixture of amino acids is a tryptic digest of lactalbumin containing tryptophane.

SIDNEY ALPERT.
GUSTAV J. MARTIN.

REFERENCES CITED

The following references are of record in the file of this patent:

UNITED STATES PATENTS

| Number | Name | Date |
|---|---|---|
| 2,408,345 | Shelton | Sept. 24, 1946 |
| 2,411,897 | Sahyun | Dec. 3, 1946 |

OTHER REFERENCES

Tice: "Amino Acids, Proteins and Protein Hydrolysates," in Am. J. Pharm., September 1946, pages 302–319. (Copy in Pat. Off. Library.)

Speel: "Mannitol and Sorbitol in Pharmacy," in Am. J. Pharm., April 1941, pages 134–141.

"Atlas Sorbitol," 1947, pages 16 and 17.